INVENTOR
Nils E. GoodActive

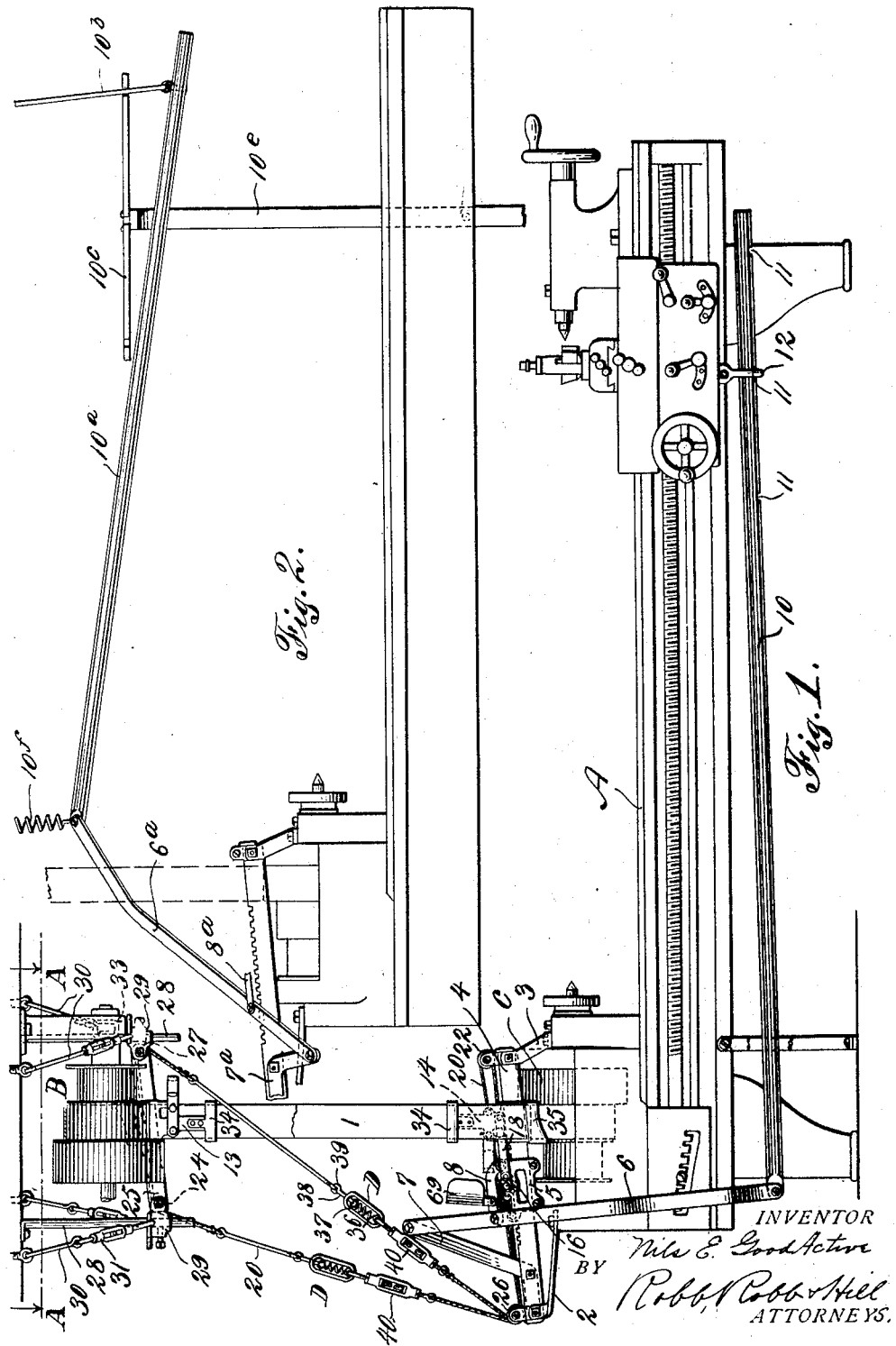

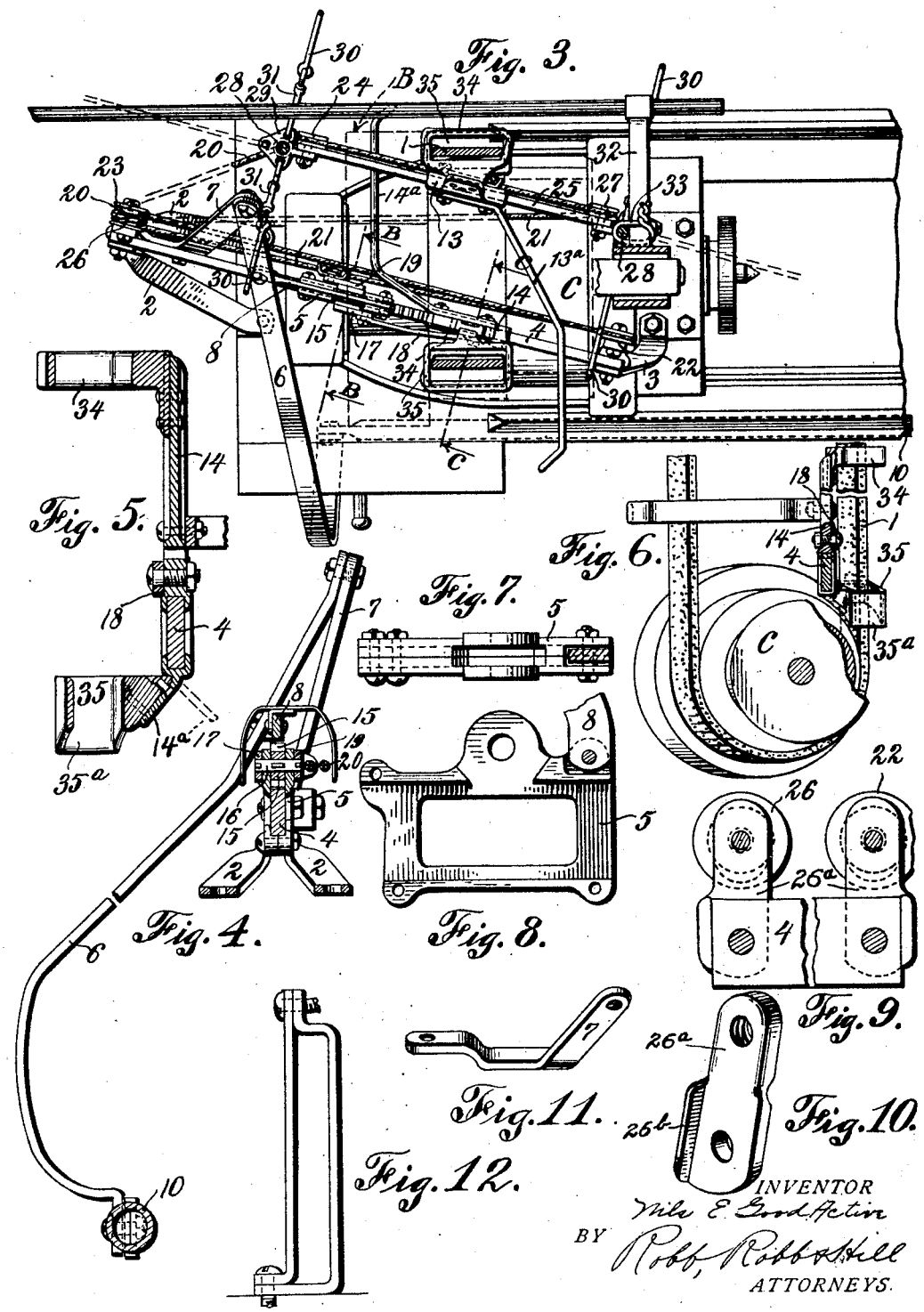

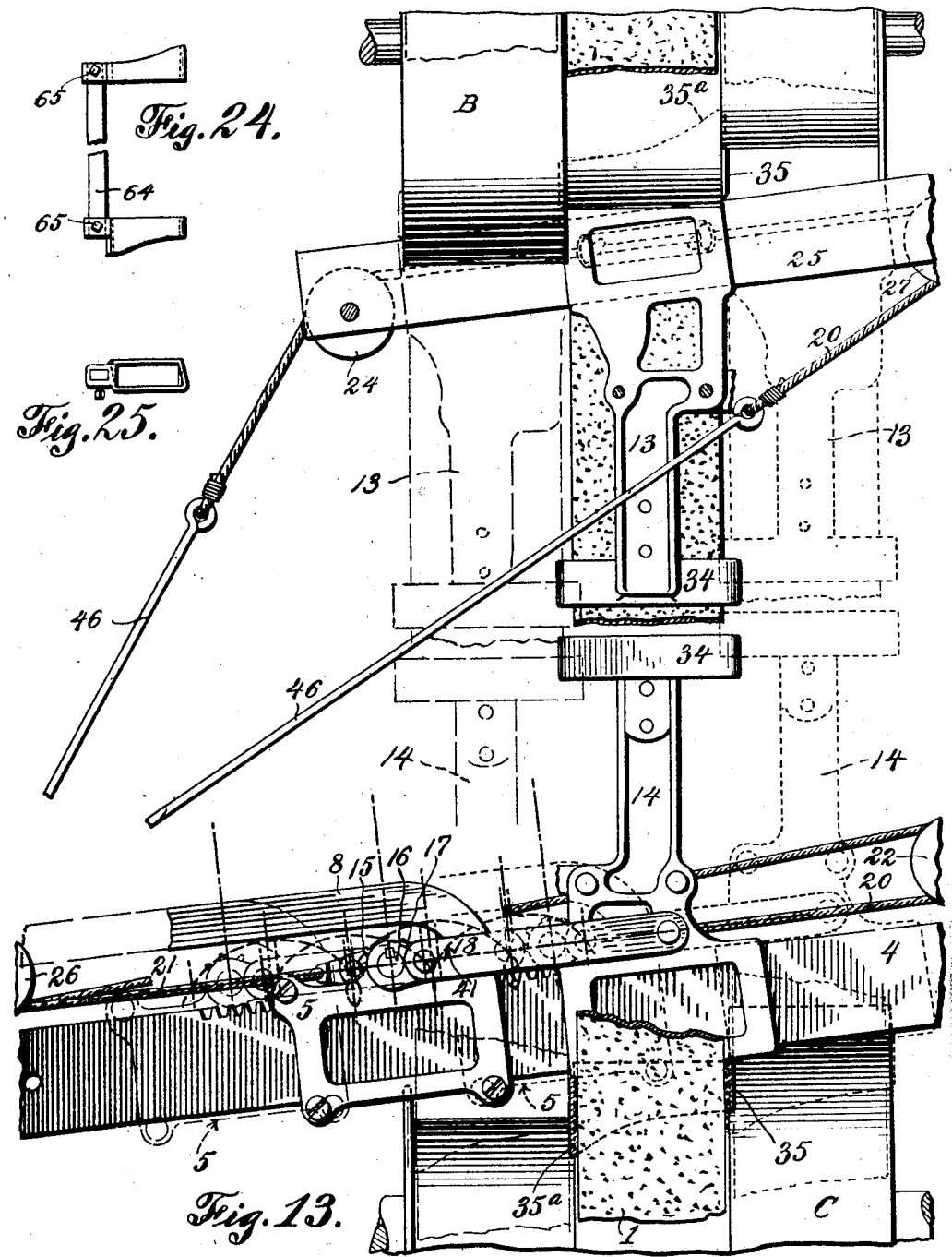

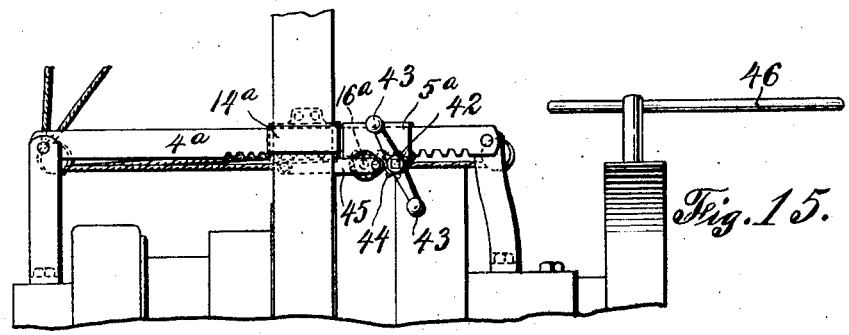
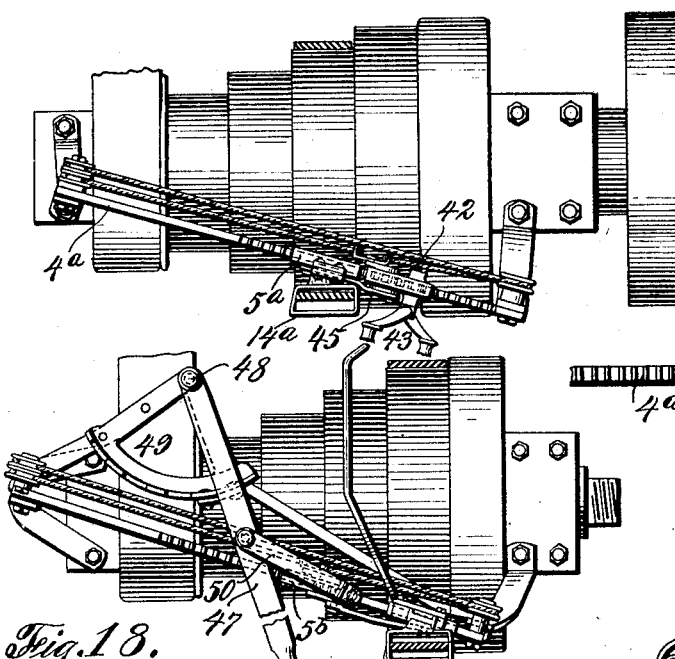
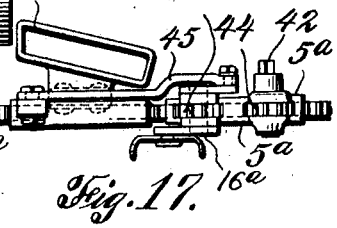
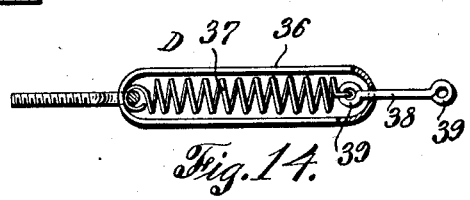
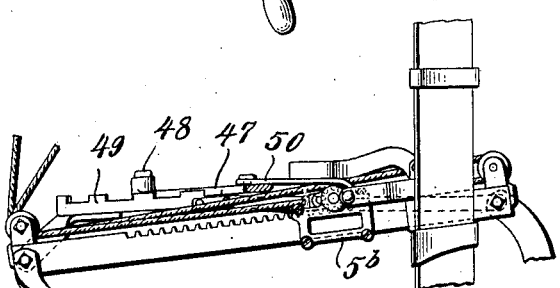

BY Robt. Robbs Hill
ATTORNEYS.

Patented June 18, 1929.

1,717,506

UNITED STATES PATENT OFFICE.

NILS E. GOODACTIVE, OF CHICAGO, ILLINOIS.

CONE-BELT-SHIFTING MECHANISM.

Application filed March 2, 1921. Serial No. 448,974.

This invention has to do with cone belt driving mechanisms such as are commonly employed today in connection with lathes, millers, shapers, drilling machines and the like.

The primary object of my present improvements has been to devise an advantageous type of shifting means for the belt connecting upper and lower cone pulleys of driving mechanisms such as above referred to. In the carrying out of my invention I utilize a peculiar type of means for alternately operating certain upper and lower belt shifters which cooperate with the upper and lower cone pulleys respectively, the object being to maintain each one of the shifters practically stationary at the time the other shifter is performing its belt shifting action.

I have adopted special means whereby an alternating mechanism, useful for the purpose just described, is common to the two belt shifters employed, affording an economy of construction, space, and insuring general simplicity as to this particular phase of the invention.

Before detailing further certain other objects of the invention, it is notable that the shifting of cone belts such as are generally provided in machine shops today is known to be a delicate operation for different reasons. Some of the belts have undue slack and looseness by reason of considerable wear, or because they are oil soaked, other belts are very tight and necessarily so because of the work which is to be done by the machines which they operate; again the belts are of different sizes respecting widths and are ofttimes dissimilarly arranged or adjusted respecting their machines. Obviously the shifting of a large tight belt requires considerable power, and any shifting means that will meet a wide range of acceptability must be able to handle such belts as well as those requiring less power. It may be suggested also that the shifting of cone belts is in operation attended with danger in many instances, as workmen are often injured when the operation is performed by hand.

With the foregoing phases of the operation and constructions of cone belt drives in mind I have devised certain mechanisms embodying the same general principles of action, but of slightly varying construction, to handle the operation of shifting a cone belt whether of any of the general kinds hereinbefore outlined as useful and commonly found in machine shops today.

Among the features of my invention deserving special mention are a peculiar double belt shifter construction acting at spaced points on the belt when shifting; a formation of belt shifting loop acting very close to the cone pulley, in fact, with the slightest possible clearance so that a minimum of wear on the belt and complete efficiency of action will result; the devising of a special form of operating means by which the actuator for the belt shifters may be caused to operate by a workman located at his place of work on the machine, and therefore not necessitating that he leave such position when the cone belt drive is located at a place remote from his particular location; the utilization of special automatic take-ups in the length of certain connections between the upper and lower belt shifters; the disposition of flexible connections intermediate the upper and lower belt shifters such that a single main actuating or alternating mechanism such as previously mentioned may coact to operate both shifters; and other detail features of construction and advantage such as will be more fully presented hereinafter.

In the accompanying drawings:—

Figure 1 is a view in elevation of a preferred form of the invention, illustrating the bed length control as applied to a lathe;

Figure 2 is a view showing a modified adaptation of the operating handle used in Figure 1;

Figure 3 is a horizontal sectional view taken about on the line A—A of Figure 1;

Figures 4 and 5 are sectional views on the line B—B and C—C of Figure 3 respectively;

Figure 6 is a sectional perspective view of a fragmentary nature showing the proximity of the lower belt shifter to the lower pulley;

Figures 7 and 8 are detail views of the main actuator or belt shifting slide;

Figures 9, 10, 11 and 12 show in regular order features of the roller brackets, the operating lever pivot bracket and the handle guide;

Figure 13 is a much enlarged view bringing out more clearly the alternating mechanism of the main belt actuator;

Figure 14 is a detail view of one of the automatic take-ups;

Figures 15 and 16 are side elevation and top plan views of a modified form of alternating and main actuating mechanism;

Fig. 17 is a view of the shifting device viewed from below in Fig. 15;

Figures 18 and 19 are plan and side views of still another modification of the alternating main actuating mechanism;

Figures 24 and 25 are side elevation and top plan views of a modified form of a double belt loop or shifter.

Figure 20:
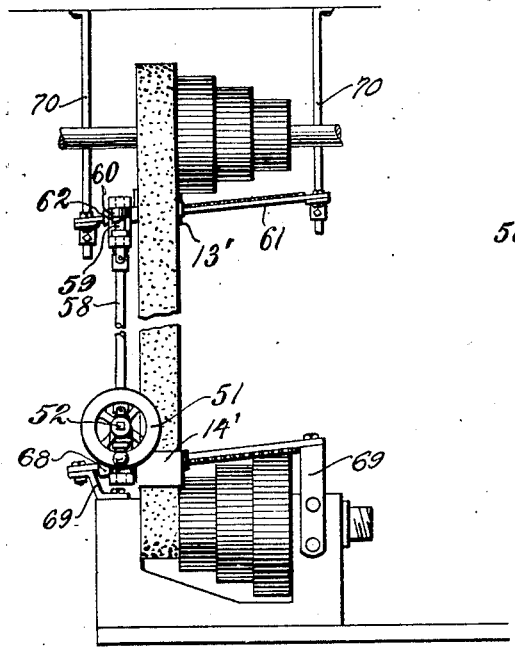
Figures 20 and 21 illustrate the side elevation and horizontal sectional views of a gear shaft actuating means for the belt shifting devices.

I shall first describe the general construction of each type of my mechanism and thereafter indicate the advantages for the same. In Figure 1 the lathe is generally indicated at A, and its cone belt driving means comprises the upper cone pulley B and the lower pulley C with which the belt 1 cooperates. Adjacent to the lower cone pulley C there is mounted upon supporting brackets 2 and 3 an inclined rack bar 4. On this rack bar 4 a main belt actuator or slide 5 is adapted to move back and forth when properly propelled by means of a lever 6 pivoted to an arm 7 projecting upwardly from the bar 4. The lever 6 is bent intermediate its ends to clear the gear box of the lathe, and has a link 8 by which it is connected to operate the slide or actuator 5. A handle rod 10 is connected at one end with the lever 6, and extends from the end of the machine at which the cone pulley C is located to the other or working end of the machine as seen in Figure 1. This arrangement of the handle 10 affords what I call my bed length control, enabling the operator to control my belt shifting means without changing his position of work at the lathe or other machine. The handle 10 is notched at 11 to engage a loop 12 and thus be held at any one of the adjustments necessary for the three belt shifts.

The mechanism for alternately actuating the belt shifters 13 and 14 for the upper and lower cone pulleys, respectively, includes a pinion 15, see Figures 3 and 4 especially, which pinion is rotatively mounted in bearings in the sides of the actuator or slide 5, by a suitable shaft 16, the ends of which project beyond said sides. The pinion 15 is keyed to the shaft 16, and on one end of the shaft is an arm 17 connected by a link 18 to the lower belt shifter 14. The opposite end of the shaft 16 has an arm 19 fixed thereto to which are secured in any suitable manner the cables 20 and 21 which extend away from the arm and the slide 5, in opposite directions. The cable 20 is trained around a grooved roller 22, at one end of the bar 4, led back to the opposite end of the bar and trained under a grooved roller 23, thence over a roller 24 on one end of the upper supporting bar 25 and secured to the upper belt shifter 13 which is slidably mounted upon said bar 25. The cable 21 is led laterally from the actuator 5 beneath a grooved roller 26 mounted coaxially with the roller 23, and thence led upwardly and laterally around a grooved roller 27 on the right hand end of the bar 25 after which the cable is secured to the slide portion of the upper shifter 13.

As shown best in Figs. 9 and 10 the direction pulley 26 is supported upon a bracket 26$^a$ connectable to the end of the rack or bar 4 and provided with an angularly turned lip 26$^b$ embracing or lying squarely against the end of the rack to prevent any possible tilting or shifting from position of the bracket and pulley, so that the likelihood of the cable becoming slack after adjustment is reduced to a minimum. The brackets for the other direction pulleys are preferably similarly constructed.

By the above arrangement it will be evident that the upper belt loop shifter 13 is compelled to move in the same direction as lower shifter 14 under the influence of movement of the cables 20 and 21.

Each shifter unit 13 and 14 comprises a bracket, the main portion of which slides upon the bar 25 or rack 4, respectively, and is provided with an integral bendable lip 14$^a$ which when the bracket is manufactured projects substantially in the plane of the bracket, but is bendable laterally from such plane, as shown in full and dotted lines in Fig. 5, for attachment of the loop 35 having the heel 35$^a$. By this construction the same pattern and hence the same casting is adapted for both the upper and lower units, the lip 14$^a$ always being bent as directed away from that pulley adjacent to which the bracket is assembled, so that the loop 35 may come as close as possible to the surface of the pulley and to bring the heel 35$^a$ in each case as close as possible to that point of the pulley upon which the belt is being shifted. As shown in Fig. 5, the loops 34 and 35 are respectively above and below the bar or rack 4.

The upper belt shifter supporting bar 25 is carried by vertical brackets 28 to which the bar 25 is adjustably secured by means of slide brackets 29 and suitable set screws therein. The brackets 28 are reinforced by the brace guys 30 which are maintained taut by the turn buckles 31. One of the brackets 28 may also be braced advantageously by tying it onto the adjacent countershaft hanger 32, the tie being designated at 33.

The lower belt shifter 14 is free to slide upon the rack bar 4, and each of the shifter units 13 and 14 comprises superposed, spaced, belt receiving and engaging loops. These loops are best illustrated in Figure 5, at 34 and 35. Either shifter unit in order to operate to best advantage and as close as possible to its pulley is preferably sloped or reduced along one edge, forming a projecting heel 35ª which will insure thrust upon that portion of the belt practically opposite the point of the larger step upon which the belt is being shifted.

Of course, in respect to the bracket supporting devices the construction of the slide actuator 5, the bracing guys and like features used by me, considerable alteration in detail construction may be employed, so I do not wish to be limited to the particular exact forms illustrated.

The cables 20 and 21 are each provided with an automatic take-up designated D and shown best in Figure 14 of the drawings. This take-up comprises a frame 36, a spring 37 in said frame, a slide rod 38 movable in one end of the frame and having eyes 39, one to engage the adjacent end of the frame and connect with the spring 37, the other to connect with the cable. At the end of the frame 36 opposite the member 38 an eye bolt connection forming a part of an adjacent turn buckle 40 connects the spring 37 practically fixedly at one end to the cable with which the particular take-up is used.

Under normal conditions the cables 20 and 21 are adjusted with the springs 37 expanded so that the eye 39 within the frame 36 is spaced slightly from the end of the frame through which the rod 38 slides, or approximately as shown in Fig. 14. However, owing to the action of the actuating or alternating mechanism to shift the upper shifter unit, when the lower shifter unit is substantially stationary the point of attachment of the cables with the end of the arm 19 is caused to swing upward in an arc of a circle out of the general path or direction of movement of the actuator, or along an irregular path, and hence it is essential that the then effective cable be lengthened as will be permitted by the normal clearance between the end of the frame 36 and the eye 39 within the frame. When, however, said point of attachment approaches the horizontal again a slack tends to be created in the cable and this slack is automatically taken up by the take-up device D. Under all conditions, therefore, the cable connections 20 and 21 are tight, a condition necessary for the effective and prompt operation of the machine. It will be noted, however, that the operating strain on the cable, to effect the shifting of the belt, is borne directly upon and through the rigid frame 36 and not upon the spring, for when the spring is stretched slightly beyond the normal, the inner eye 39 comes into direct contact with the end of the frame 36.

Reverting now to the operation of the pinion 15 and the arms 17 and 19 thereof, it should be understood that the pinon 15 is so designed as to have a size exactly proportional to the distance which the belt shifter units 13 and 14 must travel in order to shift the belt through one interval or from one step of the pulley to another; in practice the pinion 15 rotates exactly once to shift the belt through one interval. Each of the arms 17 and 19 is of a length slightly less than one-fourth of the span of said interval. Developing this feature more fully, reference is made to Figure 13 in which the curved broken line 41 represents the path of movement of the lower belt shifter actuating arm.

In this figure the broken lines indicate the paths of movement of the points of connection of the arms 17 and 19 with the cables 20 and 21. As an actual example by carefully experimenting with shifters now in successful operation the following will indicate in a rough way the proper relative dimensions of the arms 17 and 19 for a particular interval. Thus supposing the interval is 2-3/4 inches, the pinion 15 should have a pitch diameter of 7/8 of an inch. Now 1/4 of the interval is 11/16 of an inch and this should be the length of the control arms subject to the modification that I make, the lower shifter control arm 17, 9/16 of an inch in length and the upper shifter control arm 19, 5/8 of an inch in length, which is slightly greater. The gear pitch line radius is 7/16 of an inch. By the employment of these particular graduated lengths for the control arms 17 and 19 the required movements will be imparted to the arms for the purpose of correspondingly imparting to the respective belt shifter units controlled thereby the necessary alternating or successive movements to accomplish with a high degree of efficiency the transfer of the belt from a certain set of steps of the corresponding pulleys B and C to an adjacent certain set of steps.

On account of the slight difference in the lengths of the arms 17 and 19, the upper belt shifter has a slightly greater "kick" or life imparted to its movement, especially for insuring shifting of a tight or loose belt on to a cone step, or off one, prior to the operation of the lower belt shifter in a corresponding manner. The length of arm 19 being greater than that of arm 17 the complete shifting of the upper loop of the belt will be insured before the arm 17 becomes operative, even though a number of flexible and jointed connections are interposed between arm 19 and shifter unit 13. In practice the arm 19 is a little less than 1/4 of the aforesaid interval, and the arm 17 somewhat shorter, as previously suggested, both extending beyond the pitch circle of the pinion 15 which has a radius of approximately 1/6 the distance of the total gear travel.

The automatic take-ups D normally maintain a tautness of the cable connections 20 and 21 so that the cables do not stretch under operation of the shifting devices. However, the springs 37 take up any slack which may occur in the cables when the belt shift is completed and the shifter control arms 17 and 19 take their horizontal positions.

Referring to Figure 2 of the drawings the modification illustrated comprises a slightly different arrangement of the handle 10ª which is suspended from a link 10ᵇ and held in any one of its three positions by a notched plate 10ᶜ on a post 10ᵉ. The handle 10ª is connected with a lever 6ª pivoted to a bracket 7ª adapted to shift the link 8ª corresponding with the link 8 shown in Figure 1 and elsewhere. The weight of the handle 10ª is counter-balanced by a spring 10ᶠ. This arrangement of the parts is convenient for certain types of machines.

Passing now to Figures 15 to 17 inclusive, a crank control type of device is illustrated and comprises a crank shaft 42 having the turning handles 43 and carrying gears 44 adapted to engage the rack bar 4ª. The parts 42, 43 and 44 are supported by the actuator 5ª and the shaft 42 operates by its gear 44, and the shaft 16ª corresponding to the shaft 16 previously set forth, the latter having similar arms, one of which is connected by the link or pitman 45 with the lower belt shifter, the other being connected as previously set forth with the upper belt shifter. The shaft 42 has a head for detachable engagement by a crank arm, for manual rotation, to cause the actuator to move along the rack bar. Otherwise, save for mere details of support the features are like those previously set forth. The construction is very adaptable for use for large cone belts, where the belts are heavy and difficult to shift. In this construction, moreover, the lower belt shifter comprises the loop 14ª located somewhat higher up from the cone pulley than necessary for narrower belts. The operating crank handles 43 are located under the bar 4ª to give ample room for operation of the lathe clutch wrench 46.

Referring now to Figures 18 and 19, the mechanism for operating the main actuator for the belt shifters may be characterized as a "special direct lever control". In this instance a lever 47 is pivoted at 48 and held in adjusted positions by a sector 49 notched for this purpose. The lever 47 is connected by the link or pitman 50 direct with the actuator 5ᵇ, and the method of operation is self evident in view of the previous explanation.

Figure 21:
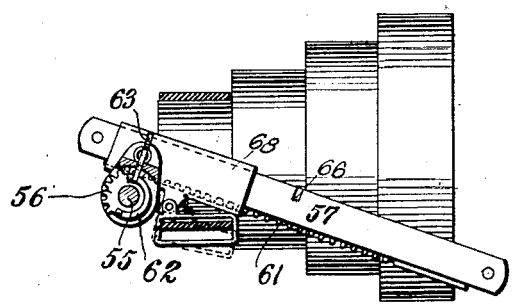
Figure 22:
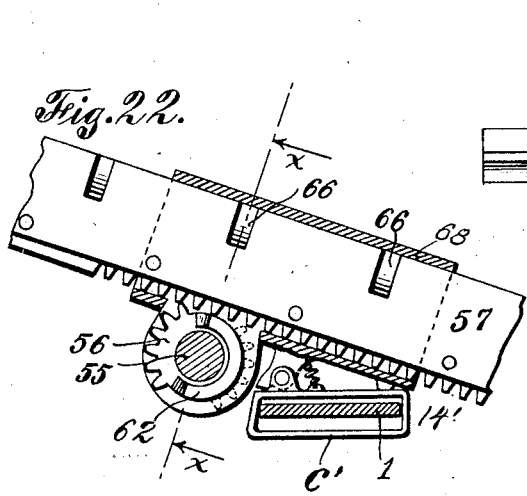
Figure 22 is an enlarged view showing the interrupted gear and rack features of the last mentioned modification.
Figure 23:
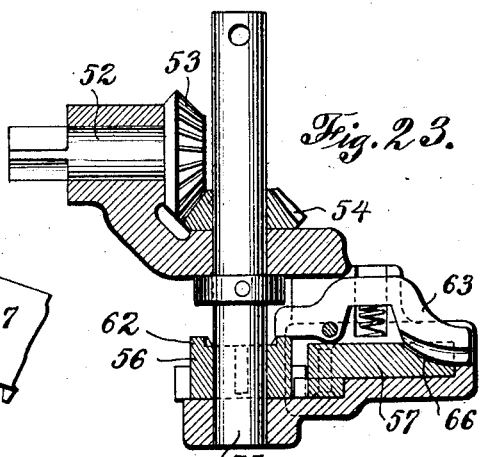
Figure 23 is a section view on the line X—X of Figure 22.

Still another type of my invention is illustrated in Figures 20 to 23 inclusive. In this instance a hand or crank wheel 51 on a shaft 52 operates a bevel pinion 53 engaging a corresponding pinion 54 on the vertical shaft 55. The shaft 55 carries an interrupted gear 56 which during a certain period of the turning of the shaft 55, by engagement with the rack bar 57 will be shifted by said rack bar longitudinally thereof. The rack bar 57 carries the lower belt shifter 14'. The shaft 55 is connected by universal joints, and an intermediate shaft section 58 to an upper shaft 59. The upper shaft is equipped with an interrupted gear 60 like the gear 56 but engaging the rack 61 connected with the upper belt shifter 13', at a different time from the time of engagement of the teeth of the gear 56 with the lower rack 57. The construction as thus described accommodates for the transmission of alternating movements from the parts 57 and 61, to the belt shifters 14' and 13' connected thereto, the shifters being carried by frames or slides 68 receiving the racks and sliding along the latter when being actuated by the gears 56.

Each of the gears 56 and 60 is equipped with a cam 62 which acts to operate a locking dog 63 on each slide 68. The lower dog 63 is caused to engage and lock its rack 57 to maintain the lower belt shifter 14' locked stationary, when the upper dog 63 is inactive for permitting the operation of the upper belt shifter, and vice versa. Each dog 63 is adapted to interlock in one of a series of three notches 66 in each rack 57 or 61, as the case may be. The racks 57 and 61 are supported by brackets 69 and rods 70 suitably carried by the machine, and depending from the ceiling respectively.

In Figure 3 especially there are seen projecting from the upper and lower belt shifters 13 and 14, the peculiar angular follower arms 13ª and 14ª, respectively carried by said shifters. Each of these arms is adapted to act upon the portion of the belt opposite that received by the shifter loops to properly ensure shifting. In other words, if by accident the belt at the upper pulley was hung on the smallest end or step, and it is desired to shift the belt to the largest step or end, the shifter would not work in the absence of the members 13ª and 14ª. This is due to the fact that there would be too much slack in the belt.

*Miscellaneous features and details.*

Figures 24 and 25 illustrate a construction in which the loops of the belt shifter are detachably and adjustably held in place upon a vertical bar 64, by means of set screws 65.

The dogs 63 are adapted to engage in notches 66 on their respective rack bars.

The loops of the belt shifters are so disposed as to be tilted sidewise and upwardly of the cone centers to pass the pulleys with the least possible clearance. The lower loops of the shifters are made deeper at one end as shown at 35ª as the tilt of the shifters is not of itself entirely sufficient. This construction is seen best in Figure 5.

A movable housing member 67 may be mounted on the actuator frame or slide link 8 to house the gear means provided adjacent thereto.

I claim:

1. The combination with a pair of cone pulleys and a belt operating thereover, of means to shift the belt step by step along said pulleys, said shifting means comprising a belt engaging member, a bar on which said member is slidable, an actuator slidable along said bar separate and spaced from the belt engaging member, the actuator being movable along the bar with a substantially uniform rate of speed, and connecting means between the actuator and the belt engaging member for moving the belt engaging member in the same direction as the actuator and at a comparatively irregular rate.

2. Mechanism as set forth in claim 1 in which the connecting means is a rigid link pivoted to both the belt engaging member and the actuator.

3. Mechanism as set forth in claim 1 in which the actuator and the belt engaging member are movable independently of each other along the bar at different speeds.

4. Mechanism as set forth in claim 1 in which the connecting means is a rigid link acting to cause movement of the belt engaging member during a part only of the movement of the actuator.

5. Mechanism as set forth in claim 1 in which the actuator is operated by means of a member engageable by the operator from any point along the length of the machine.

6. Mechanism as set forth in claim 1 in which a hand operated member is provided to move the actuator, said hand operated member being located below the level of the top of the machine body and is engageable by the operator from any position along the machine and is movable in the same direction as the belt is to be shifted.

7. The combination with a pair of cone pulleys and a belt operating thereover, of means to shift the belt step by step along the pulleys, said shifting means including a shifter unit adjacent to each pulley, an actuator comprising a pinion journaled thereon, a rack, means to slide the actuator along the rack at a certain speed, causing rotation of the pinion, connecting means between the pinion and one of said units, causing movement of said unit in the same direction as the actuator but at a different speed, and connections between the actuator and the other shifter unit.

8. Mechanism as set forth in claim 7 in which the shifter units are operated in succession.

9. Mechanism as set forth in claim 7 in which one of the shifter units is operated during a part of the time of the operation of the actuator and the other shifter unit is operated during another part of the time of movement of the actuator.

10. Mechanism as set forth in claim 7 in which the actuator causes movement of one shifter unit during the first half of its movement and the other shifter unit during the second half of its movement.

11. The combination with a pair of cone pulleys and a belt operating over them, of means to shift the belt step by step along said pulleys, said shifting means including a bar adjacent to one of said pulleys, a shifter unit embracing the belt and slidable along said bar, a shifter unit adjacent to the other pulley and also embracing the belt, an actuator movable and guided along said bar remote from the shifter unit thereon, a rotary member journaled on the actuator and caused to rotate coincident with the sliding of the actuator, a link pivoted to the adjacent shifter unit and so connected to said rotary member as to cause movement of its shifter unit during a part of the movement of the actuator but at a different speed, and connections between the actuator and the other shifter unit.

12. Mechanism as set forth in claim 11 in which the latter mentioned connections for the other shifter unit are connected to the said rotary member but operated therefrom to cause the shifting of the two units in alternation.

13. Mechanism as set forth in claim 11 in which the rotary member includes two oppositely arranged crank arms to one of which the adjacent shifter unit is connected, and flexible connections between the other crank arm and the remote shifter unit.

14. Mechanism as set forth in claim 11 in which the rotary member includes two crank arms, one longer than the other, but extending in opposite directions from the axis of the member, the adjacent shifter unit being connected to one of said arms, and flexible connections between the other of said arms and the remote shifter unit.

15. Mechanism as set forth in claim 11 in which the rotary member includes two crank arms, one longer than the other, the adjacent shifter unit being connected to the shorter arm, and flexible connections between the longer arm and the remote shifter unit for giving a more pronounced impulse to the movement of the remote shifter unit.

16. In a cone belt shifter, the combination with a step or cone pulley and a belt cooperating therewith, of a shifter unit embracing the belt, said unit comprising a heel member bearing against the edge of the belt remote from the edge of the pulley step upon which the belt is to be shifted, and means to move the shifter unit.

17. In a belt shifter, the combination with upper and lower pulleys and a belt cooperating therewith, of a shifter means for the belt comprising a bar extending adjacent to the surface of the upper pulley, a shifter unit movable along said bar, means to shift said shifter unit, and means to hold the bar as indicated comprising a plurality of guys having turn buckles for tightening the same, said guys being connected to the ends of the bar.

18. Mechanism as set forth in claim 17 in which the means for securing the bar comprises a pair of brackets along which the ends of the bar are adjustable and guy members on opposite sides of the brackets serving to position the bar along the brackets, and means to fasten the remote ends of the brackets to a rigid support.

19. The combination with two spaced cone pulleys and a belt operative thereover and shiftable therealong step by step, of shifting means for the belt comprising a bar adjacent to one of the pulleys, an actuator movable along the bar and including a member movable in an irregular path as a result of the movement of the actuator, a shifter unit adjacent to the pulley remote from the one at the bar, flexible connections between said shifter unit and said member and variable in effective length due to the irregular path aforesaid, and take-up means interposed in said flexible connections to maintain the connections tight, the take-up means including a rigid member, a spring along the rigid member, and a link slidable along one end of the rigid member, said link being connected to the spring and adapted to abut against the rigid member so as to insure a positive draft on the connections when power is applied thereto to shift the belt.

20. A belt shifter unit comprising a bar, means to support the bar adjacent to the face of the pulley, a bracket slidable along the bar, and a loop to embrace the belt connected to the bracket, the means to connect the loop including a lip formed integral with the main part of the bracket and bendable laterally from the general plane thereof and away from the face of the pulley to afford the closest possible approach of the loop to the pulley.

21. In a belt shifter, the combination with a fixed bar, an actuator movable thereon, a pulley remote from the bar, and a belt operative over the pulley, of connections between the actuator and the belt including a flexible member for shifting the belt, a direction pulley for the flexible member, and a bracket for the direction pulley, said bracket being secured to the end of the bar and including an integral lip projecting angularly therefrom and resting against the extreme end of the bar.

In testimony whereof I affix my signature.

NILS E. GOODACTIVE.